US012747718B2

(12) United States Patent
Sörensen

(10) Patent No.: US 12,747,718 B2
(45) Date of Patent: Sep. 29, 2026

(54) METHOD OF MANUFACTURING A WIND TURBINE ROTOR BLADE PART HAVING AN EMBEDDED PLACEHOLDER

(71) Applicant: Nordex Blade Technology Centre ApS, Stenstrup (DK)

(72) Inventor: Flemming Sörensen, Svendborg (DK)

(73) Assignee: Nordex Blade Technology Centre ApS, Stenstrup (DK)

( * ) Notice: Subject to any disclaimer, the term of this patent is extended or adjusted under 35 U.S.C. 154(b) by 0 days.

(21) Appl. No.: 19/226,841

(22) Filed: Jun. 3, 2025

(65) Prior Publication Data

US 2025/0290484 A1 Sep. 18, 2025

Related U.S. Application Data

(63) Continuation of application No. PCT/EP2023/079195, filed on Oct. 19, 2023.

(30) Foreign Application Priority Data

Dec. 5, 2022 (EP) .................................... 22211439

(51) Int. Cl.
*F03D 1/06* (2006.01)
*B29C 33/58* (2006.01)
(Continued)

(52) U.S. Cl.
CPC ............ *F03D 1/0677* (2023.08); *B29C 70/30* (2013.01); *B29C 70/682* (2013.01); *B29C 33/58* (2013.01);
(Continued)

(58) Field of Classification Search
CPC ..... Y02E 10/72; F03D 1/0658; F03D 1/0675; F03D 1/0677; F03D 1/065; F03D 80/50;
(Continued)

(56) References Cited

U.S. PATENT DOCUMENTS 8,388,316 B2 * 3/2013 Arocena De La Rua .................. B29C 70/865 29/889.7
8,491,399 B2 * 7/2013 Suefuji ................ B29C 70/865 29/527.1

(Continued)

FOREIGN PATENT DOCUMENTS

CN 208040633 U 11/2018
WO 2019/110068 A1 6/2019
WO 2022096497 A1 5/2022

OTHER PUBLICATIONS

International Preliminary Report on Patentability of the International Bureau of WIPO dated Jun. 10, 2025 for international application PCT/EP2023/079195 on which this application is based.

(Continued)

*Primary Examiner* — Eric J Zamora Alvarez
(74) *Attorney, Agent, or Firm* — Walter Ottesen, P.A.

(57) ABSTRACT

A method of manufacturing a wind turbine rotor blade part, the method including: providing a placeholder including a core member and a sleeve, wherein the core member defines a longitudinal direction and has a circumferential surface, a front end and a back end, and the sleeve includes a peel ply layer, wherein the sleeve covers the circumferential surface and the back end of the core member and is affixed to the back end of the core member; arranging the placeholder together with reinforcing fibers and a matrix material in a mold; curing of the matrix material, so that the placeholder is embedded in a fiber-reinforced composite material.

11 Claims, 5 Drawing Sheets

(51) Int. Cl.

| | |
|---|---|
| ***B29C 70/30*** | (2006.01) |
| ***B29C 70/68*** | (2006.01) |
| ***B29C 70/86*** | (2006.01) |
| ***B29D 99/00*** | (2010.01) |
| ***B29L 31/08*** | (2006.01) |

(52) U.S. Cl.
CPC ... *B29L 2031/085* (2013.01); *F05B 2240/302* (2013.01); *F05B 2280/6003* (2013.01)

(58) Field of Classification Search
CPC .......... B29L 2031/085; B29L 2031/737; Y02P 70/50; B29C 70/86; B29C 70/48; B29C 70/443; B29C 66/721; B29C 66/53; B29C 70/682; B29C 33/42; B29C 45/02; B29C 45/14065; B29C 66/72; B29C 70/52; B29C 33/58; B29C 33/68; B29C 70/30; B29C 70/34; B29C 70/46; F05B 2240/302; F05B 2280/4003; F05B 2230/60; F05B 2280/6003; F05B 2230/23; F05B 2240/301; F05B 2250/232; F05B 2250/70; F05B 2260/30; F05B 2280/6013; F05B 2230/604; B29D 99/0028; B29D 99/0025; F05D 2230/60; F05D 2230/80; F05D 2240/30; F01D 5/18; F01D 5/28
See application file for complete search history.

(56) References Cited

U.S. PATENT DOCUMENTS

| | | | | |
|---|---|---|---|---|
| 9,464,622 | B2 * | 10/2016 | Caruso | F03D 1/0658 |
| 9,970,304 | B2 * | 5/2018 | Caruso | B29C 66/72 |
| 10,087,911 | B2 * | 10/2018 | Feigl | F03D 1/0658 |
| 10,190,571 | B2 * | 1/2019 | Samudrala | F03D 1/0658 |
| 11,067,056 | B2 * | 7/2021 | Jacobsen | F03D 1/0675 |
| 11,644,005 | B2 * | 5/2023 | Bernu | B29D 99/0025 416/204 R |
| 2015/0071701 | A1 * | 3/2015 | Raina | B29C 66/53 403/270 |
| 2019/0283347 | A1 | 9/2019 | Walker et al. | |
| 2020/0263658 | A1 * | 8/2020 | Madsen | B29D 99/0025 |
| 2021/0180572 | A1 * | 6/2021 | Thiebaut | B23P 6/002 |

OTHER PUBLICATIONS

International Search Report of the European Patent Office dated Jan. 3, 2024 for international application PCT/EP2023/079195 on which this application is based.

Written Opinion of the International Searching Authority dated Jan. 3, 2024 for international application PCT/EP2023/079195 on which this application is based.

* cited by examiner

METHOD OF MANUFACTURING A WIND TURBINE ROTOR BLADE PART HAVING AN EMBEDDED PLACEHOLDER

CROSS-REFERENCE TO RELATED APPLICATIONS

This application is a continuation application of international patent application PCT/EP2023/079195, filed Oct. 19, 2023, designating the United States and claiming priority from European application 22211439.9, filed Dec. 5, 2022, and the entire content of both applications is incorporated herein by reference.

TECHNICAL FIELD

The disclosure relates to a method of manufacturing a wind turbine rotor blade part comprising a placeholder. The placeholder is embedded in a fiber-reinforced composite material of the wind turbine rotor blade part with the intention to later remove the placeholder, such that a cavity is formed in the fiber-reinforced composite material. This cavity can be used in particular for inserting and fastening a joining element to the wind turbine rotor blade part.

BACKGROUND

From WO 2022/096497 A1, such a method has become known. In order to ensure that the placeholder can be removed from the fiber-reinforced composite material, the known method suggests using a placeholder with a non-binding surface including a PTFE material, or with an outer layer including a release agent, a sacrificial material or a peel ply.

SUMMARY

Departing therefrom, it is an object of the disclosure to provide an improved method and an improved placeholder that make forming of a cavity having the desired surface characteristics even more easy.

This object is solved by various methods and placeholders according to the disclosure.

The method of manufacturing a wind turbine rotor blade part includes:

- providing a placeholder including a core member and a sleeve, wherein the core member includes a longitudinal direction, a circumferential surface, a front end and a back end, and the sleeve includes a peel ply layer, wherein the sleeve covers the circumferential surface and the back end of the core member and is affixed to the back end of the core member;
- arranging the placeholder together with reinforcing fibers and a matrix material in a mold;
- curing of the matrix material, so that the placeholder is embedded in a fiber-reinforced composite material.

The wind turbine rotor blade part may be any part of a wind turbine rotor blade, in particular a shell part such as a half shell, a spar, a spar cap or a longitudinal segment of any of these wind turbine rotor blade parts. The wind turbine rotor blade part may also be a connection part that is intended for use as a root connection of a wind turbine rotor blade to a hub of a wind turbine rotor or as a connection of a wind turbine rotor blade segment to another rotor blade segment. The fastening of the wind turbine rotor blade to the hub or of the wind turbine rotor blade segments to each other can be realized via joining elements, in particular sleeves, for example sleeves having a threaded bore, and/or bolts. These joining elements are anchored in the wind turbine rotor blade part when the placeholder embedded in the fiber-reinforced composite material of the wind turbine rotor blade part is removed and replaced with the joining element. The longitudinal direction of the placeholder of the wind turbine rotor blade part can correspond to a longitudinal direction of the wind turbine blade part, and, ultimately, to a longitudinal direction of the wind turbine blade for which the wind turbine rotor blade part is used.

The wind turbine rotor blade part may include a joining surface that will get in contact/cooperate with an adjacent component such as a wind turbine rotor blade hub or another wind turbine rotor blade part or segment. The placeholder can be embedded in the fiber-reinforced composite material such that it is accessible from the outside, in particular such that the placeholder and/or more specifically the front end of the placeholder is arranged at the joining surface. The joining surface can be arranged substantially perpendicular to the longitudinal direction of the placeholder and/or of the wind turbine rotor blade part. The placeholder may have any suitable shape, for example cylindrical or conical, so that it corresponds to the shape of a joining element with which the placeholder shall later be replaced.

Manufacturing of the wind turbine rotor blade part is at least in part carried out in a mold. The shape and size of the mold depend on the type of the wind turbine rotor blade part. The mold may have a forming surface at which a joining surface of the wind turbine rotor blade part is formed. It may have another forming surface which corresponds to an aerodynamic surface of the wind turbine rotor blade part. An open mold or a closed mold may be used.

The reinforcing fibers can be arranged in the mold in layers. The reinforcing fibers may include any suitable fiber type, for example glass fibers or carbon fibers, or a mixture of these, also in combination with any other fiber types. The reinforcing fibers can be dry and/or pre-impregnated with the matrix material. If dry reinforcing fibers are placed in the mold, the matrix material can be added using any suitable process, for example by hand as in traditional hand-layup techniques, by vacuum infusion or by resin injection. The matrix material may be a polyester or epoxy resin, for example.

The placeholder may be positioned in the mold so that its front end is arranged at a joining surface. To this end, the mold may have a positioning means for positioning the placeholder. The positioning means may in particular be arranged at a forming surface of the mold corresponding to the joining surface. For example, the placeholder may have a threaded bore and the mold may have a flange with a through hole, so that the placeholder can be held in place with a bolt guided through the through hole and screwed into the threaded bore of the placeholder. In the alternative or in addition, the placeholder may be held in place via other elements placed within the mold, in particular by the reinforcing fibers and/or by foam cores placed within the mold. The core member of the placeholder may be made of metal, in particular steel or aluminum. However, other materials of sufficient stiffness and strength may also be used.

After the matrix material has cured, the reinforcing fibers and the cured matrix material (and optionally any other material positioned within the mold) form a fiber-reinforced composite material in which the placeholder is embedded. This means at least a substantial part of the placeholder's surface, in particular corresponding to its entire circumferential surface or a major part thereof, will be covered by the fiber-reinforced composite material.

It is an advantage of the disclosure that it is particularly easy to integrate a joining element into the wind turbine rotor blade part by removing the placeholder and replacing it with the joining element. To this end, the placeholder can be removed from the fiber-reinforced composite material simply by pulling out the placeholder in a direction away from its back end. The sleeve with the peel ply layer prevents the matrix material from forming a strong bond with the placeholder's core member, which is a prerequisite for the ability to remove the core member in an easy manner. At the same time, the specific arrangement of the sleeve and its fixation to the back end of the core member has the effect that when pulling the core member out of the fiber-reinforced composite material, the sleeve will be peeled off the wall of the fiber-reinforced composite material surrounding the placeholder, so that the sleeve will be removed in its entirety from the fiber-reinforced composite material together with the core member. Ideally, the cavity thus formed in the fiber-reinforced composite material will have a clean surface free of any remainders of the sleeve. This clean surface will be well-suited for obtaining a strong bond between the wall of the cavity and a joining element adhered thereto.

The wind turbine rotor blade part may be provided with any number of placeholders, for example with only one, two, three or more than three placeholders. Each of the placeholders is embedded in the fiber-reinforced composite material and is removable from the fiber-reinforced composite material as described above.

In an aspect, the step of providing a placeholder includes applying a release agent to at least the circumferential surface of the core member. A release agent may also be applied to the core member's surface at the back end. The release agent reduces the force required to pull out the core member of the fiber-reinforced composite material as it allows the core member to slide along the sleeve's inner surface. This also helps to achieve a smooth peeling-off process of the sleeve from the fiber-reinforced composite material.

In an aspect, the step of providing a placeholder includes a step of wrapping the peel ply layer about the circumferential surface of the core member. This is an easy way to form a closely fitting sleeve covering the entire circumferential surface. If desired, the peel ply layer may be fixed via an adhesive (for example, an adhesive tape or an adhesive spray) applied in particular to an outer surface of a section of the peel ply layer, which outer surface contacts an adjacent inner surface of another section of the peel ply layer.

In an aspect, the step of providing a placeholder further includes a step of folding a section of the peel ply layer that extends along the longitudinal direction beyond the back end of the core member against the back end. This section of the peel ply layer (or any number of corresponding sections) may be fixed via an adhesive as well.

In an aspect, the step of providing a placeholder includes a step of providing the sleeve by forming the peel ply layer such that it has a sock-like shape and a subsequent step of inserting the core member into the sleeve. Sock-like means the sleeve is formed substantially like a tube with a closed end, so that the sleeve will automatically cover the circumferential surface and the back end of the core member once the core member is inserted in the sleeve. In order to bring the peel ply layer in the sock-like shape, any suitable technique may be used, including adhering or sewing peel ply layer sections to one another.

In an aspect, the sleeve is affixed to the back end of the core member via a clamping element exerting a clamping force on the peel ply layer of the sleeve. This was found to be a very simple and reliable solution for affixing the sleeve, in particular because the clamping element is easy to apply to any peel ply layer, and the clamping force will be almost independent of the exact properties of the peel ply layer in terms of materials and thickness, for example. The clamping element can be arranged such that the clamping force presses the peel ply layer against the back end of the core member.

In an aspect, the clamping element is a head of a screw or a washer placed beneath the head of a screw, which screw is screwed into a threaded bore provided at the back end of the core member. In accordance with this aspect, the peel ply layer can be placed between the back end of the core member and the head of the screw or the washer, respectively. Via the screw, a large clamping force can be applied, leading to a safe attachment of the sleeve to the core member. Moreover, the screw and/or the washer can be used many times, in particular if a release agent is applied to the screw and/or the washer before these elements are getting in contact with the matrix material.

In an aspect, the clamping element has a circumferential lip contacting the peel ply layer. The lip can be arranged at a bottom side of the clamping element, for example, in a circumferential groove. The lip provides a well-defined contact area for holding the peel ply layer. The lip can also prevent matrix material from getting into the bore hole of the screw connection and blocking the screw connection.

In an aspect, the method includes the additional step of connecting a pulling tool to a fastening element of the core member.

The fastening element in particular is an opening at the front end of the core member, for example, a threaded bore which is used to assemble the core member to a flange of the mold. Alternatively, the fastening elements can extend beyond the front end of the core member such as a hook, a lug or a pin.

Via the pulling tool, it is particularly easy to apply the required pulling force to the core member to pull the same together with the sleeve out of the surrounding fiber-reinforced composite material.

In an aspect, the method includes the additional step of pulling the core member out of the fiber-reinforced composite material along the longitudinal direction towards the front end, such that the sleeve is peeled off the fiber-reinforced composite material and a cavity is formed in the fiber-reinforced composite material.

As has been explained above, this additional step will lead to a cavity in the fiber-reinforced composite material well-suited for fastening a joining element thereto.

In an aspect, the method includes the additional step of inserting and fastening a joining element in the cavity, wherein the joining element in particular is a bushing with a threaded bore.

The joining element may in particular be fastened in the cavity via an adhesive.

The above problem is also solved by the placeholder according to various embodiments of the disclosure. A placeholder is for being embedded in a fiber-reinforced composite material of a wind turbine rotor blade part and includes:

a core member including a longitudinal direction, a circumferential surface, a front end and a back end, and a sleeve including a peel ply layer, wherein the sleeve covers the circumferential surface and the back end of the core member and is affixed to the back end of the core member.

The placeholder is meant to be used in a method with the features according to various embodiments of the disclosure. With regard to the features and advantages of the placeholder, reference is made to the above explanations relating to the method, which apply to the placeholder as well.

The placeholder can be adapted in accordance with the various aspects of the method explained above. For example, the placeholder may include a release agent applied to at least the circumferential surface of the core member. The peel ply layer may be wrapped about the circumferential surface of the core member. A section of the peel ply layer that extends along the longitudinal direction beyond the back end of the core member may be folded against the back end. The peel ply layer may have a sock-like shape. The sleeve may be affixed to the back end of the core member via a clamping element exerting a clamping force on the peel ply layer of the sleeve. The clamping element may be a head of a screw or a washer placed beneath the head of a screw, which screw is screwed into a threaded bore provided at the back end of the core member. The clamping element may have a circumferential lip contacting the peel ply layer. The core member may include a fastening element for connecting a pulling tool to the core member, wherein the fastening element in particular may be an opening at the front end of the core member or a connecting means extending beyond the front end of the core member such as a hook, a lug or a pin.

In an aspect, a wind turbine rotor blade part includes a fiber-reinforced composite material and a placeholder according to various embodiments of the disclosure, wherein the placeholder is embedded in the fiber-reinforced composite material.

In an aspect, the placeholder is embedded in the fiber-reinforced composite material such that when pulling the core member out of the fiber-reinforced composite material along the longitudinal direction towards the front end, the sleeve is peeled off the fiber-reinforced composite material and a cavity is formed in the fiber-reinforced composite material.

BRIEF DESCRIPTION OF DRAWINGS

The invention will now be described with reference to the drawings wherein.

DETAILED DESCRIPTION

Figure 1:
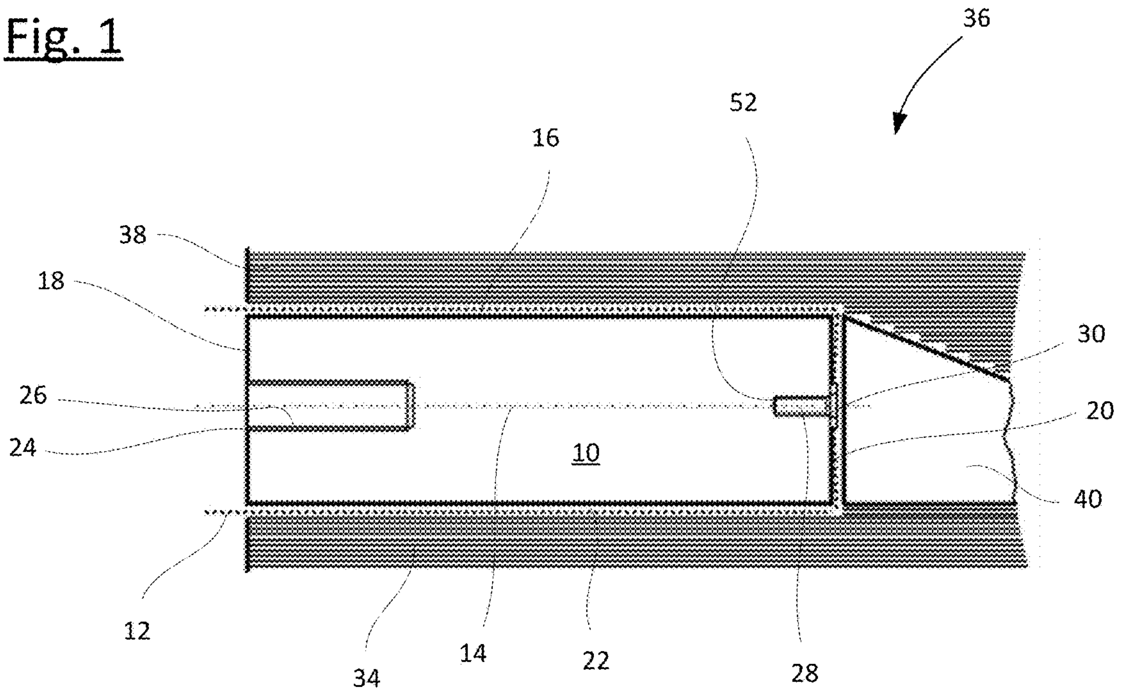
FIG. 1 shows a wind turbine rotor blade part with an embedded placeholder in a schematic, longitudinal section.

FIG. 1 shows in cross section a placeholder including a core member 10 and a sleeve 12. The core member 10 has a longitudinal direction 14, a circumferential surface 16, a front end 18 and a back end 20. The sleeve 12 consists of a peel ply layer 22 having a sock-like shape. The sleeve covers the entire circumferential surface 16 as well as the back end 20 of the core member 10.

The core member 10 further includes a fastening element, namely an opening 24 having an inner thread 26. The opening 24 is arranged at the front end 18 of the core member 10. At its back end 20, the core member has a threaded bore 52 into which a screw 28 is inserted. The screw 28 has a screw head 30 and serves as a clamping element which is exerting a clamping force on the peel ply layer 22 of the sleeve 12. A section of the peel ply layer 22 covering the back end 18 is arranged between a bottom side of the screw head 30 and the back end 20 of the core member 10.

The placeholder is embedded in a fiber-reinforced composite material 34 of a wind turbine rotor blade part 36. The wind turbine rotor blade part 36 has a joining surface 38 which is flush with the front end 18 of the core member 10. The sleeve 12 extends beyond the front end 18 of the core member 10, so that there is no direct contact between the core member 10 and the surrounding fiber-reinforced composite material 34. The fiber-reinforced composite material 34 is arranged below, above and to the right of the placeholder. Only the front end 18 of the core member is accessible from the outside. Next to the back end 20 of the core member 10 and embedded in the fiber-reinforced composite material 34, the wind turbine rotor blade part 36 includes a wedge-shaped foam core 40.

In order to manufacture the wind turbine rotor blade part 36 of FIG. 1, the placeholder is provided and arranged in a mold (not shown) together with reinforcing fibers and a matrix material. The matrix material is then allowed to cure, so that the placeholder is embedded in the fiber-reinforced composite material 34.

Figure 2:
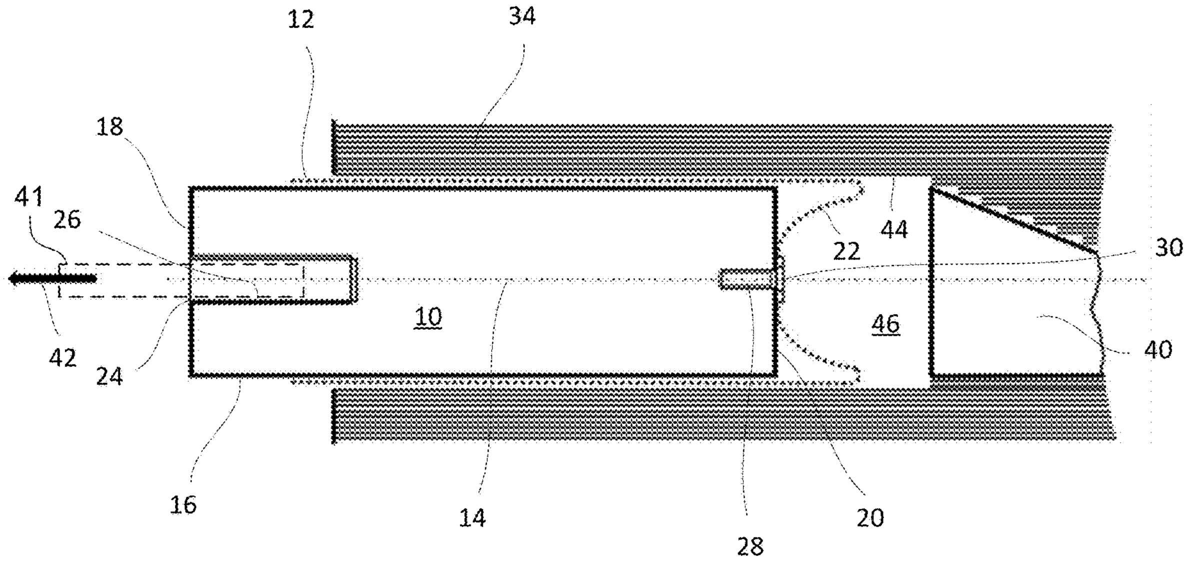
FIG. 2 shows the arrangement of FIG. 1 while pulling out the placeholder.

FIG. 2 shows the arrangement of FIG. 1 while pulling out the core member 10 of the surrounding fiber-reinforced composite material 34 in the direction of the arrow 42, towards the front end 18. This may be done by fastening a pulling tool 41 to the opening 24. One can see that the peel ply layer 22 remains affixed to the back end 20. The core member 10 slides out of the sleeve 12, and the sleeve 12 is peeled off the wall 44 of the cavity 46 formed in the fiber-reinforced composite material 34.

Figure 3:
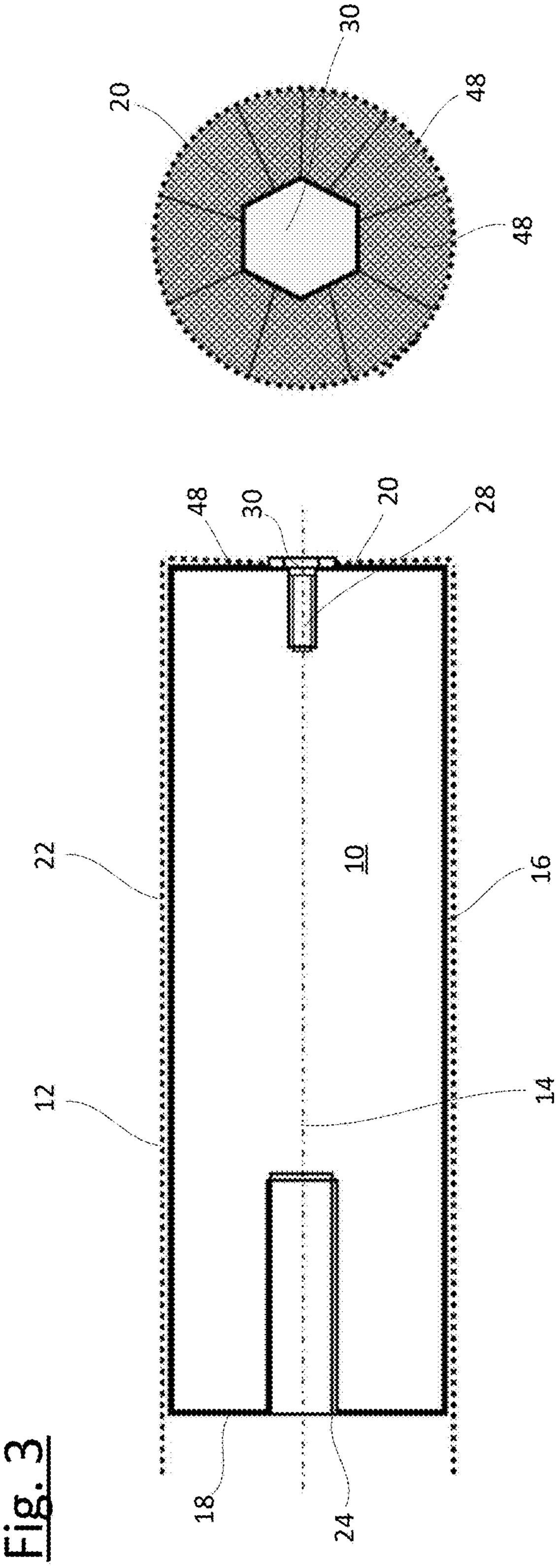
FIG. 3 shows a placeholder in two schematic views.

FIG. 3 shows another placeholder, seen to the left of the figure in a longitudinal section and to the right of the figure in a view on the back end 20. The placeholder is similar to the one shown in FIGS. 1 and 2. The sleeve 12 has been formed by wrapping the peel ply layer 22 around the circumferential surface 16 of the core member 10. Sections 48 of the peel ply layer 22 extending beyond the back end 20 of the core member 10 have been folded against the back end 20. They are affixed to the back end via the screw head 30 of the screw 28.

Figure 4:
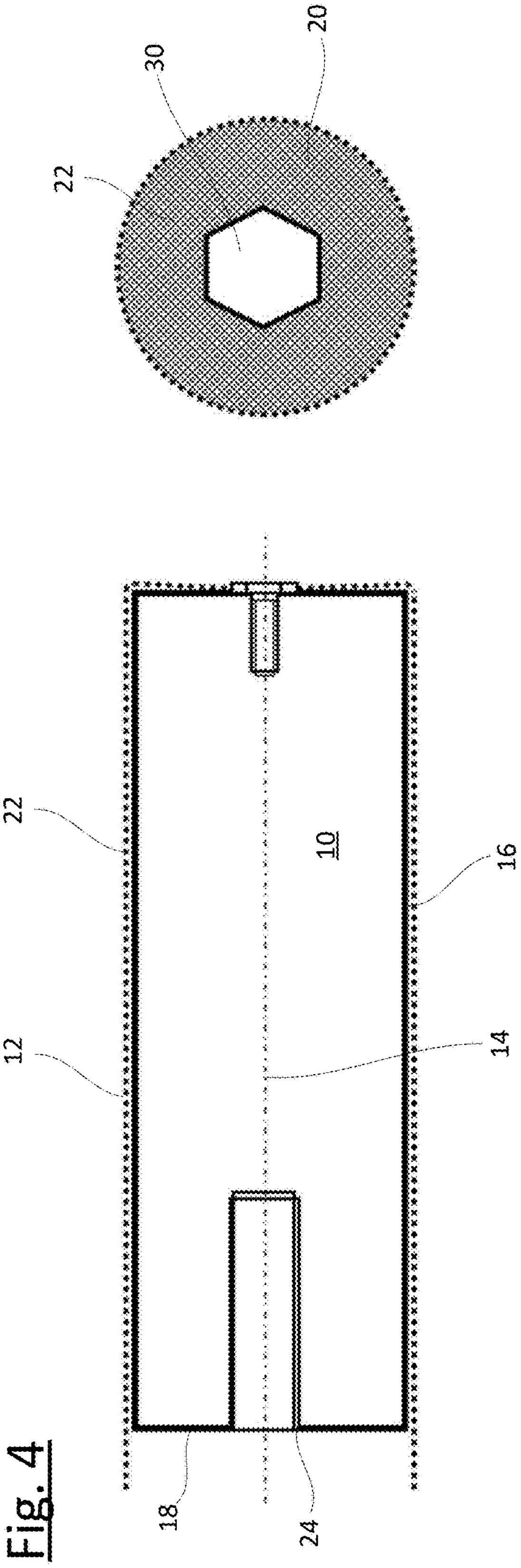
FIG. 4 shows another placeholder in two schematic views.

FIG. 4 shows still another placeholder, seen to the left of the figure in a longitudinal section and to the right of the figure in a view on the back end 20. The placeholder is similar to the one shown in FIGS. 1 and 2. It differs from the placeholder of FIG. 3 only in how the sleeve 12 has been formed. Here, the peel ply layer 22 was provided with a sock-like shape in advance, and the core member 10 was then inserted into the sleeve 12.

Figure 5:
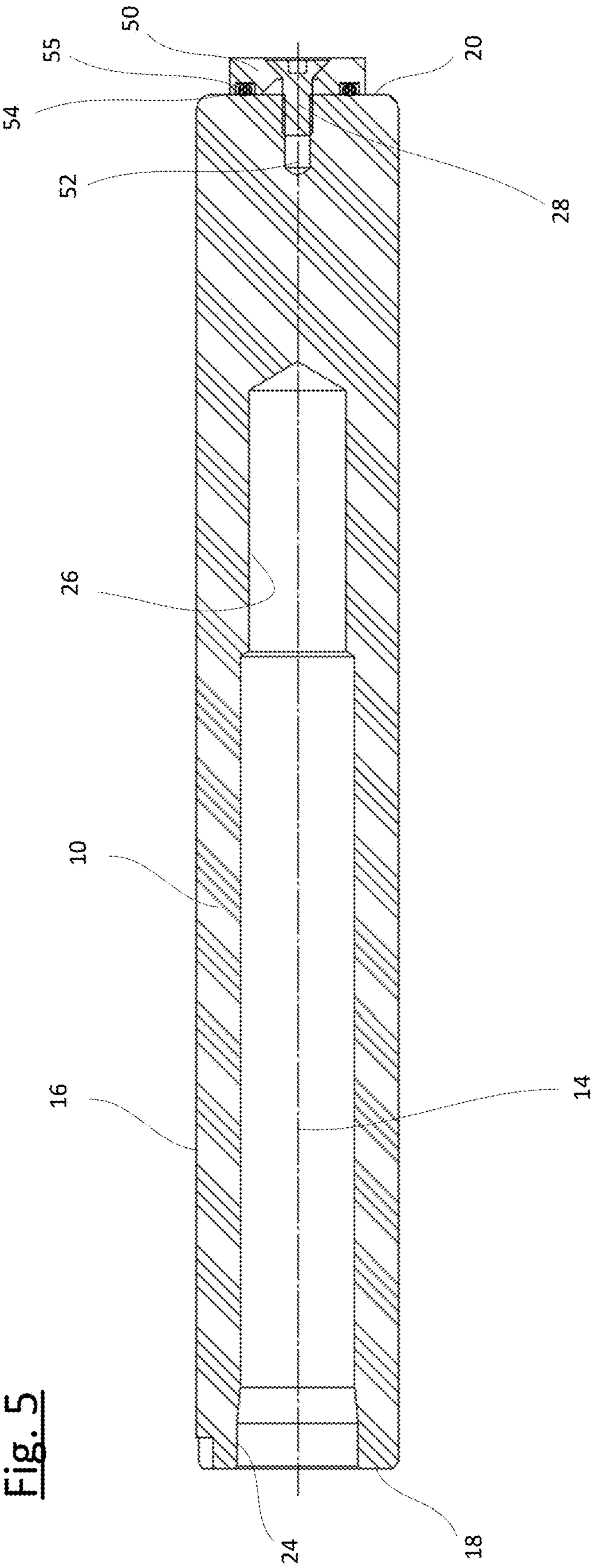
FIG. 5 shows a core member of still another placeholder in a longitudinal section.

FIG. 5 shows a core member 10 of still another placeholder, in a longitudinal section only. The core member 10 has a longitudinal direction 14, a circumferential surface 16, a front end 18 and a back end 20. The core member 10 further includes an opening 24 having an inner thread 26 and serving as a fastening element for attaching the core member to a mold flange and/or for assembling a pulling tool (not shown). The opening 24 is arranged at the front end 18 of the core member 10. At its back end 20, the core member 10 has a threaded bore 52 into which a screw 28 is inserted. The screw 28 has a screw head 30. A large-diameter washer 50 is placed beneath the screw head 30 and can be pressed against the back end 20 for clamping a section of a sleeve 12 (not shown) to the back end 20.

At a bottom side of the washer 50, a circumferential groove 54 is formed which can accept an O-ring 55 serving as a lip for clamping the sleeve 12 and for forming a seal between the back end 20 and the washer 50.

Figure 6:
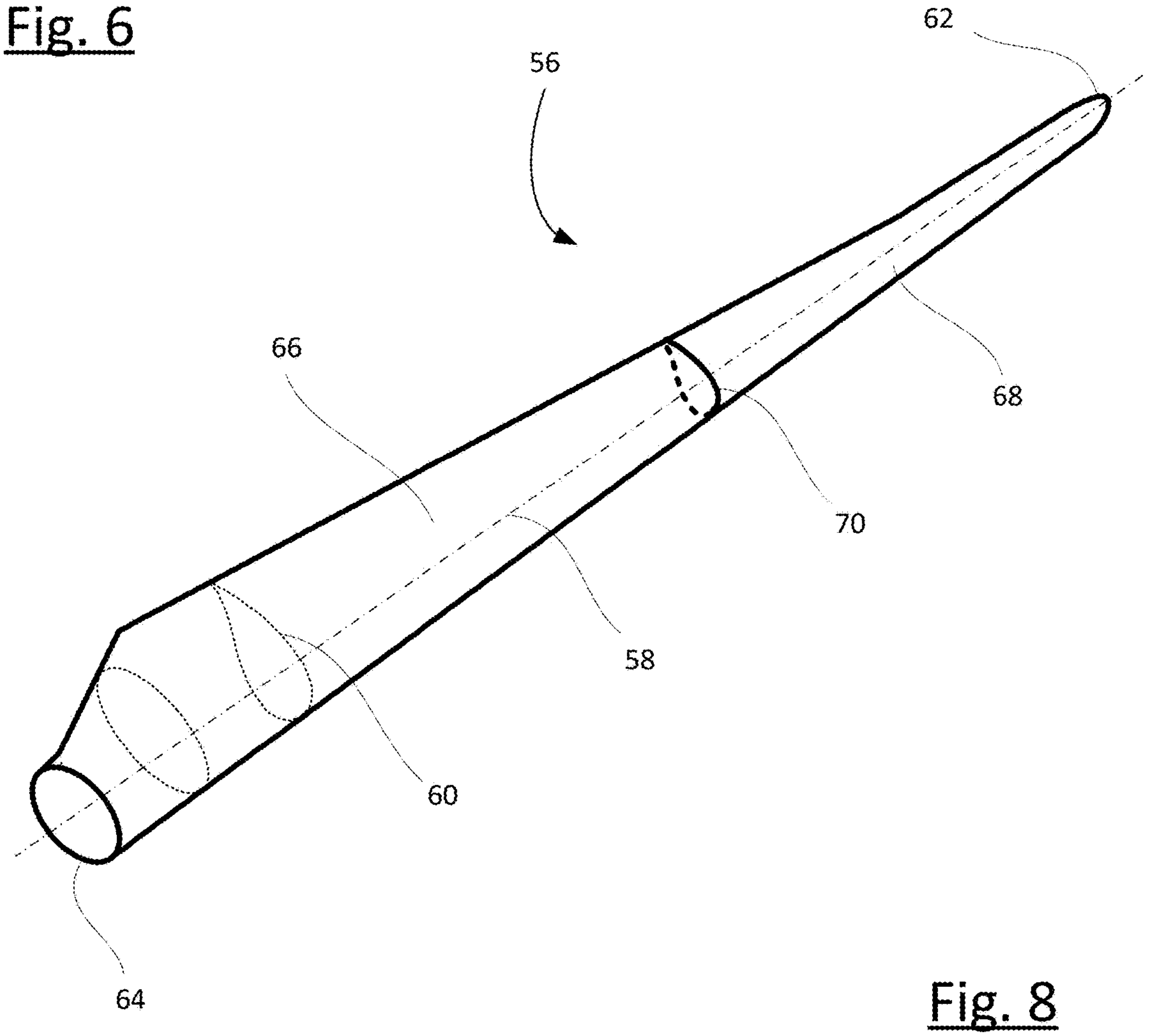
FIG. 6 shows a wind turbine rotor blade in a schematic, perspective view.

FIG. 6 shows a wind turbine rotor blade 56 having a longitudinal axis 58, an aerodynamic profile 60, a blade tip 62 and a blade root 64. The wind turbine rotor blade 56 is divided in two segments, namely an inner segment 66 including the blade root 64 and an outer segment 68 including the blade tip 62. The two segments 66 and 68 are joined to each other at a segmentation plane 70.

Figure 7:
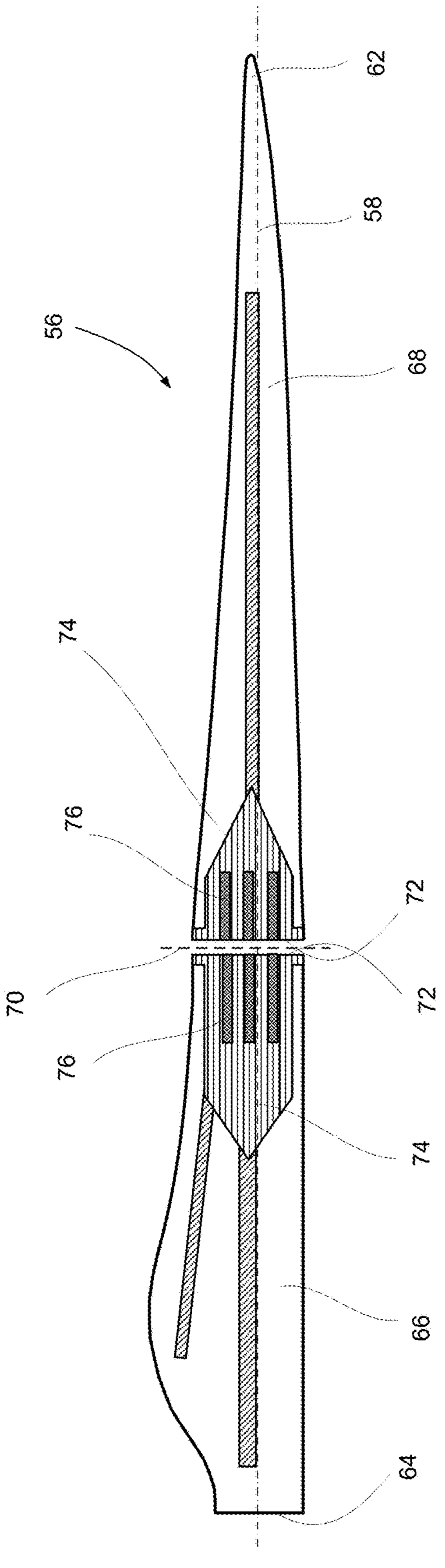
FIG. 7 shows a wind turbine rotor blade with two longitudinal segments each having a wind turbine rotor blade connection part; and, FIG. 8 shows a wind turbine rotor blade part arranged at a wind turbine rotor blade root.

FIG. 7 shows the wind turbine rotor blade of FIG. 6 in another schematic view. The two segments 66, 68 are drawn in a distance from each other. Each one has a joining surface 72. Each of the segments 66, 68 includes a wind turbine rotor blade connection part 74 facing the segmentation plane 70 and forming the respective joining surface 72. In each of the wind turbine rotor blade connection parts 74, three placeholders 76 are embedded.

Figure 8:
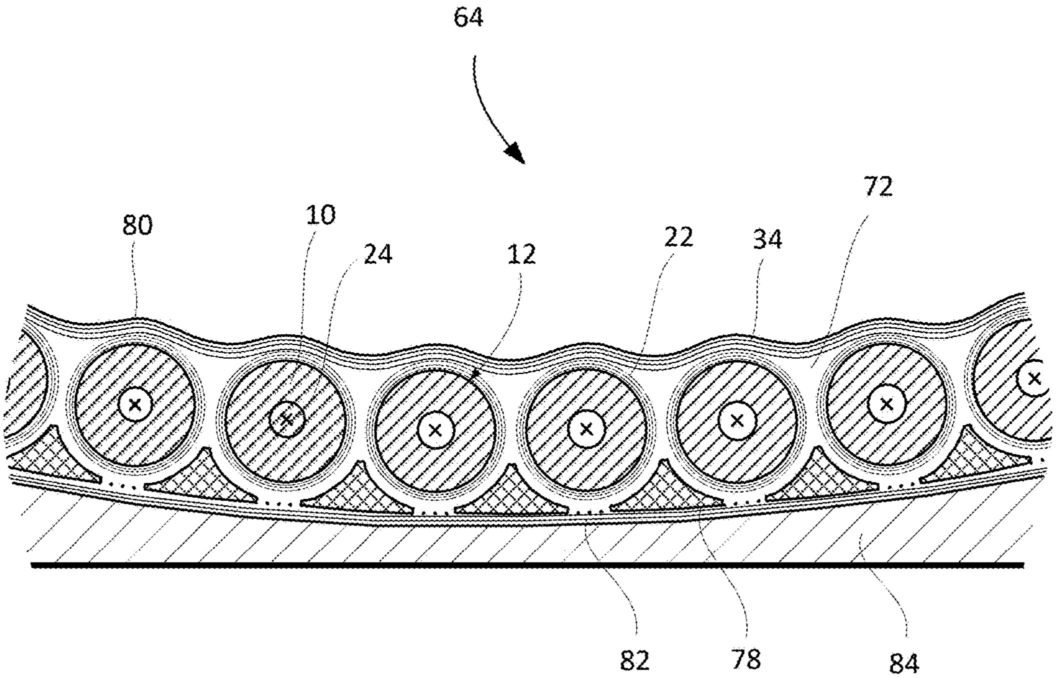

FIG. 8 illustrates a way to employ the method at a wind turbine rotor blade root 64. The view is directed on a joining surface 72 of the wind turbine blade root 64, which is adapted to be connected to a wind turbine rotor hub. The wind turbine blade root 64 is shown in a mold 84 and includes a fiber-reinforced composite material 34 having a plurality of inner layers 80 and a plurality of outer layers 82 of a fiber material. On top of the outer layers 82, foam cores 78 are placed, and between each pair of foam cores, a placeholder including a core member 10 and a sleeve 12 is arranged. Each core member 10 includes an opening 24 for fastening a pulling tool.

It is understood that the foregoing description is that of the preferred embodiments of the invention and that various changes and modifications may be made thereto without departing from the spirit and scope of the invention as defined in the appended claims.

LIST OF REFERENCE NUMERALS

10 core member
12 sleeve
14 longitudinal direction
16 circumferential surface
18 front end
20 back end
22 peel ply layer
24 opening
26 inner thread
28 screw
30 screw head
34 fiber-reinforced composite material
36 wind turbine rotor blade part
38 joining surface
40 foam core
42 arrow (pulling direction)
44 wall
46 cavity
48 section of the peel ply layer
50 washer
52 threaded bore
54 circumferential groove
55 O-ring
56 wind turbine rotor blade
58 longitudinal axis
60 aerodynamic profile
62 blade tip
64 blade root
66 inner segment
68 outer segment
70 segmentation plane
72 joining surface
74 wind turbine rotor blade connection part
76 placeholder
78 foam cores
80 inner layer
82 outer layer
84 mold

The invention claimed is:

1. A method of manufacturing a wind turbine rotor blade part, the method comprising:

providing a placeholder including a core member and a sleeve, wherein the core member defines a longitudinal direction and includes a circumferential surface, a front end surface, and a back end having a back end surface, and the sleeve includes a peel ply layer, wherein the sleeve covers the circumferential surface and the back end surface of the core member and is affixed to the back end surface of the core member;

arranging the placeholder together with reinforcing fibers and a matrix material in a mold; and, curing of the matrix material, so that the placeholder is embedded in a fiber-reinforced composite material.

2. The method of claim 1, wherein said providing the placeholder includes applying a release agent to at least the circumferential surface of the core member.

3. The method of claim 1, wherein said providing the placeholder includes wrapping the peel ply layer about the circumferential surface of the core member.

4. The method of claim 1, wherein said providing the placeholder includes:

providing the sleeve by forming the peel ply layer such that said peel ply layer has a sock-like shape; and, inserting the core member into the sleeve.

5. The method of claim 1 further comprising connecting a pulling tool to a fastening element of the core member.

6. The method of claim 1 further comprising pulling the core member out of the fiber-reinforced composite material along the longitudinal direction towards the front end surface, such that the sleeve is peeled off the fiber-reinforced composite material and a cavity is formed in the fiber-reinforced composite material.

7. The method of claim 6 further comprising inserting and fastening a joining element in the cavity.

8. A method of manufacturing a wind turbine rotor blade part, the method comprising:

providing a placeholder including a core member and a sleeve, wherein the core member defines a longitudinal direction and includes a circumferential surface, a front end surface, and a back end having a back end surface, and the sleeve includes a peel ply layer, wherein the peel ply layer covers the circumferential surface and the back end surface of the core member and is affixed to the back end surface of the core member;

arranging the placeholder together with reinforcing fibers and a matrix material in a mold;

curing of the matrix material, so that the placeholder is embedded in a fiber-reinforced composite material;

wherein said providing the placeholder includes wrapping the peel ply layer about the circumferential surface of the core member; and, wherein said providing the placeholder further includes folding a section of the peel ply layer that extends along the longitudinal direction beyond the back end of the core member and against the back end surface.

9. A method of manufacturing a wind turbine rotor blade part, the method comprising:

providing a placeholder including a core member and a sleeve, wherein the core member defines a longitudinal direction and includes a circumferential surface, a front end, and a back end, and the sleeve includes a peel ply layer, wherein the sleeve covers the circumferential surface and the back end of the core member and is affixed to the back end of the core member;

arranging the placeholder together with reinforcing fibers and a matrix material in a mold;

curing of the matrix material, so that the placeholder is embedded in a fiber-reinforced composite material; and, wherein the sleeve is affixed to the back end of the core member via a clamping element exerting a clamping force on the peel ply layer of the sleeve.

10. The method of claim 9, wherein the clamping element is a head of a screw or a washer placed beneath the head of the screw, wherein the screw is screwed into a threaded bore provided at the back end of the core member.

11. The method of claim 9, wherein the clamping element has a circumferential lip contacting the peel ply layer.

* * * * *